United States Patent
Ye et al.

(10) Patent No.: US 12,216,974 B2
(45) Date of Patent: Feb. 4, 2025

(54) MULTI-SCALE METHOD FOR HIGH-TEMPERATURE STRUCTURE ABLATION PREDICTION OF HYPERSONIC VEHICLES

(71) Applicant: BEIHANG UNIVERSITY, Beijing (CN)

(72) Inventors: Zhifan Ye, Beijing (CN); Jin Zhao, Beijing (CN); Zhihui Li, Beijing (CN); Dongsheng Wen, Beijing (CN); Guice Yao, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 18/203,713

(22) Filed: May 31, 2023

(65) Prior Publication Data

US 2024/0265177 A1  Aug. 8, 2024

(51) Int. Cl.
  *G06F 30/28* (2020.01)
  *G06F 30/15* (2020.01)
  *G06F 111/10* (2020.01)
  *G06F 119/08* (2020.01)

(52) U.S. Cl.
  CPC ............. *G06F 30/28* (2020.01); *G06F 30/15* (2020.01); *G06F 2111/10* (2020.01); *G06F 2119/08* (2020.01)

(58) Field of Classification Search
  CPC ...... G06F 30/28; G06F 30/15; G06F 2111/10; G06F 2119/08
  See application file for complete search history.

(56) References Cited

U.S. PATENT DOCUMENTS 8,725,470 B1 * 5/2014 Brown ................... G06F 30/28
                                                                    703/2

FOREIGN PATENT DOCUMENTS

CN     106682392 A    5/2017
CN     112597590 A    4/2021

OTHER PUBLICATIONS

Henline, "CFD Analysis of Hypersonic Flowfields with Surface Thermochemistry and Ablation", Sep. 9, 1997 (Year: 1997).*

(Continued)

*Primary Examiner* — Jack Chiang
*Assistant Examiner* — Brandon Bowers
(74) *Attorney, Agent, or Firm* — Jose Cherson Weissbrot (57) ABSTRACT

A multi-scale prediction method for an ablation behavior of a hypersonic aircraft heat resistant structure, includes inputting hypersonic inflow far field boundary conditions into a macro CFD solver to perform numerical simulation of the external flow field of a hypersonic aircraft; extracting the mass fraction and temperature distribution of wall surface components; obtaining an msd.txt file and an atomic path file recording the mean square displacement data through a micro RMD solver; obtaining the ratio of mass loss rate to material density, namely, the ablation retreating rate using the MSD method and Fick's law; inputting it into a CFD solver for performing grid reconstruction and transient calculation to obtain the transient variation in the external flow field of a hypersonic aircraft along the ablation retreating of the aircraft wall surface.

7 Claims, 10 Drawing Sheets

(56) References Cited

OTHER PUBLICATIONS

Ye el al., "A hybrid CFD-RMD multiscale coupling framework for interfacial heat and mass simulation under hyperthermal ablative conditions", International Journal of Heat and Mass Transfer, vol. 213, Oct. 2023 (Year: 2023).*

Chen et al., "Ablation and Thermal Response Program for Spacecraft Heatshield Analysis", Journalof Spacecraft and Rockets vol. 36, No. 3, (May-Jun. 1999).*

* cited by examiner

Figure 1

Phenolic Resin Single Chain ($C_{56}H_{50}O_8$)

```
 1  10944 atoms
 2  0 bonds
 3  0 angles
 4  0 dihedrals
 5  0 impropers
 6  3 atom types
 7  0 bond types
 8  0 angle types
 9  0 dihedral types
10  0 improper types
11  -3.1 62.8  xlo xhi
12  -3.1 62.4  ylo yhi
13  -3.7 32.9  zlo zhi
14
15 # Pair Coeffs
16 #
17 # 1  C
18 # 2  H
19 # 3  O
20
21  Masses
22
23  1 12.010700 # C
24  2 1.007940 # H
25  3 15.999400 # O
26
27  Atoms # charge
28
29  1 1 0.000000 39.577000 13.570000 25.341999 # C
30  2 1 0.000000 40.235001 14.596000 26.281000 # C
31  3 2 0.000000 39.973000 15.702000 26.191000 # H
32  4 1 0.000000 41.244999 14.129000 27.347000 # C
33  5 1 0.000000 41.592999 12.635000 27.475000 # C
34  6 3 0.000000 41.876999 15.134000 28.282000 # O
```

Figure 4

```
# Time-averaged data for fix fxmsd
# TimeStep c_msd[1] c_msd[2] c_msd[3] c_msd[4]
500000 0 0 0 0
501000 18.8312 20.1515 18.3623 57.345
502000 77.9602 83.2863 75.9564 237.203
503000 499.291 516.011 478.204 1493.51
504000 105.017 121.767 113.009 339.792
505000 249.056 276.494 269.524 795.075
506000 1856.79 1916.67 1777.92 5551.38
507000 1197.26 1263.45 1160.18 3620.89
508000 535.338 611.035 558.477 1704.85
509000 1220.54 1328.76 1212.16 3761.46
510000 3578.11 3747.62 3454.74 10780.5
511000 1280.48 1436.66 1308.84 4025.98
512000 897.374 1066.63 997.38 2961.38
513000 2937.08 3184.76 2906.21 9028.05
514000 4464.47 4776.67 4369.91 13611.1
515000 4153.03 4493.47 4100.66 12747.2
516000 2234.99 2558.06 2339.58 7132.63
517000 3407.64 3798.54 3460.08 10666.3
518000 9768.74 10350 9488.35 29607.1
519000 5926.07 6455.91 5881.74 18263.7
520000 5399.94 5952.56 5420.49 16773
```

```
 1 ITEM: TIMESTEP
 2 11000
 3 ITEM: NUMBER OF ATOMS
 4 9121
 5 ITEM: BOX BOUNDS pp pp ff
 6 0.0000000000000000e+00 3.0049620000000001e+01
 7 0.0000000000000000e+00 3.0049620000000001e+01
 8 -2.0000000000000000e+02 3.0000000000000000e+02
 9 ITEM: ATOMS id type x y z vx vy vz q
10 6134 1 5.11604 5.87077 1.74261 0 0 0 -0.0299168
11 6151 2 3.85008 6.72697 0.0691923 0 0 0 0.0415792
12 6148 1 0.656272 4.42122 1.08394 0 0 0 -0.0174322
13 6147 1 1.69552 5.2496 0.875731 0 0 0 0.00705063
14 6142 1 3.88159 6.66915 1.16789 0 0 0 -0.010202
15 8136 2 1.57062 2.14848 0.820462 0 0 0 0.0169937
16 8126 1 0.968786 0.328627 1.85481 0 0 0 -0.00269383
17 8127 1 1.90861 1.27913 1.4054 0 0 0 -0.0224446
18 6146 1 0.639488 3.98938 2.49345 0 0 0 -0.0128869
19 6143 1 2.64195 5.78963 1.67167 0 0 0 -0.00527279
20 8128 1 3.26174 1.11702 1.72929 0 0 0 -0.0125506
21 8135 2 3.99858 1.85588 1.38524 0 0 0 0.0164513
22 6144 1 2.57177 5.34506 3.06654 0 0 0 -0.0165478
23 6132 1 5.06522 4.47089 1.95252 0 0 0 -0.0111069
24 6139 2 4.18493 3.87121 1.66931 0 0 0 0.0186332
25 6128 1 8.7368 6.73681 2.98819 0 0 0 -0.0131462
26 6120 1 9.5618 6.85977 1.74462 0 0 0 -0.0353356
27 6118 1 10.4671 5.72799 1.27576 0 0 0 -0.0159785
28 6125 2 10.4802 4.7797 1.85676 0 0 0 0.0191749
29 6117 1 11.2972 5.95423 0.235868 0 0 0 0.000255086
30 6130 1 7.23475 4.63874 3.0466 0 0 0 -0.00659112
31 6129 1 7.33015 5.98917 2.65212 0 0 0 -0.0606619
32 6133 1 6.25538 6.64241 2.04326 0 0 0 0.255102
33 6140 2 6.08093 2.77363 2.84773 0 0 0 0.0187655
34 6131 1 6.12039 3.85604 2.63365 0 0 0 -0.0225103
35 5856 2 14.7575 5.00511 1.92225 0 0 0 0.0641909
```

MULTI-SCALE METHOD FOR HIGH-TEMPERATURE STRUCTURE ABLATION PREDICTION OF HYPERSONIC VEHICLES

TECHNICAL FIELD

This invention generally relates to the technical field of aerospace science, conducting research on fluid-solid coupling scale-span numerical simulation for a semi-active heat resistance system (an ablation-type heat resistant material), and more particularly, to a multi-scale prediction method for an ablation behavior of a hypersonic aircraft heat resistant structure.

BACKGROUND

The service environment of a hypersonic aircraft is more challenging than that of a low-speed aircraft due to aerodynamic heating and non-equilibrium effect of high temperature gas during flight. Therefore, overcoming extreme heat load by means of a heat resistance system has become a challenge in nowadays. The ablation heat resistant material in the semi-active heat resistance system possesses high heat resistance performance. However, due to the ablation retreating effect, the shape deformation of an aircraft becomes unavoidable, and complex heat and mass transfer phenomenon inevitably occur at the gas-solid interface, which affects the heat distribution on the surface of the heat resistant material of an aircraft while increasing the difficulty of heat prediction.

In engineering, the research on the surface heat properties of a hypersonic aircraft mainly focuses on three aspects: wind tunnel experiments, theoretical derivation, and numerical simulation. However, except for the high cost and long test period, hypersonic wind tunnel experiments also fail to meet the requirements of key parameters such as enthalpy and Reynolds number for hypersonic aircraft flight environments. Due to the low calculation efficiency, theoretical derivation methods fail to solve higher order multivariate complex equations and describe large complex physical models. Numerical simulation methods achieve comparatively high calculation efficiency and low cost, which is able to compensate for the shortcomings of the other two methods to a certain extent. Traditional CFD numerical simulation methods for aerodynamic heat calculation adopts a finite chemical reaction rate model obtained through empirical equations for complex reactions on the wall surface. However, these finite chemical reaction rate models are all based on the macro continuity hypothesis, and the actual scale differences of the gas-solid interface of materials during the hypersonic flight may lead to the failure of the continuity hypothesis. At high Knudsen number Kn, small equilibrium deviations may lead to the failure of the continuous medium method, resulting in significant fluctuations in macro properties. Therefore, it is necessary to conduct more detailed research on heterogeneous reaction paths at the micro scale to provide more accurate wall boundary conditions. However, in the field of hypersonic ablation heat resistant systems, a complete set of multi-scale coupled numerical simulation methods capable of representing the heterogeneous reaction mechanism of the gas-solid interface while providing high-precision heat prediction for macro heat resistant systems has not yet been achieved.

To study the wall surface ablation phenomenon of heat resistant materials, Chinese patent CN112597590A discloses a calculation method for the ablation mass loss of resin-based heat resistant materials. This method simulates the process of heat resistant materials under aerodynamic heating and performs a numerical integration of the ablation mass loss rate of heat resistant materials based on the concentration distribution of oxidation gas, internal temperature distribution of heat resistant materials, and properties of oxidation dynamics. However, this method is limited to resin-based materials and does not directly simulate wall surface ablation phenomena. Instead, it uses a simplified numerical model for calculation, failing to represent the wall surface ablation behavior of heat resistant materials. For the design of hypersonic aircrafts, Chinese patent CN106682392A discloses a rapid calculation method for the ablation effect of complex hypersonic aircrafts. Through combining the inviscid external flow solution of Prandt's theory with the boundary layer theory, the time-varying properties of temperature distribution of heat resistant structures, the heat flow density distribution and the ablation rate of the heat resistant system wall surface ablation of a complex-shape hypersonic aircraft are obtained. However, this method is merely used to obtain the heat properties of solid materials, failing to achieve a numerical simulation of heat dynamic properties of a flow field.

For multi-scale ablation simulation methods, in a thesis (Mehta N A, Levin D A. Multiscale modeling of damaged surface topology in a hypersonic boundary[J]. The Journal of Chemical Physics, 2019, 151(12): 124710.), molecular dynamics (MD) is used to perform path simulations of ice-like argon and amorphous silica aggregates on high-order pyrolytic graphite (HOPG) with smooth surfaces and on quartz with relatively rough surfaces. In this method, the obtained adhesion probability and elastic modulus are used to model the surface evolution at a micron scale to control the number of sites available for being executed in the Monte Carlo method for precisely simulating the erosion phenomenon of HOPG surface caused by molecular impact. However, this method does not connect micro results with macro CFD calculations, resulting in the failure of improving the precision of macro aerodynamic heat prediction through micro-scale numerical simulation.

SUMMARY

The present invention provides a multi-scale prediction method for an ablation behavior of a hypersonic aircraft heat resistant structure. This method is coupled with macro-scale and micro-scale numerical simulation, capable of predicting the evolution mechanism of material interfaces under heat-dynamic coupling, enhancing the ability to represent the evolution mechanism of gas-solid interface materials, and improving the precision of surface heat prediction for ablation heat resistant systems. The present invention significantly facilitates a fine and integrated design of the heat resistant system through the scale-span numerical simulation and provides necessary scientific and theoretical support for the development and research of hypersonic aircrafts.

The present invention adopts ANSYS Fluent as a macro scale solver, which is currently one of the most comprehensive CFD software in the industry. Fluent integrates multiple algorithms and formats, possessing density-based and pressure-based solvers. Density-based solvers are normally used for solving compressible flows, while pressure-based solvers are normally used for solving incompressible flows. According to the calculation format of N-S equation, Fluent has two formats: AUSM and Roe-FDS. Roe-FDS is more commonly used, while AUSM is good at numerical simulation of hypersonic flows. Therefore, this solver is suitable for solving the external flow field of hypersonic aircrafts, consistent with the research object of the present invention.

The micro-scale reaction molecular dynamics simulation research of the present invention is conducted based on the open-source code platform of the LAMMPS (Large Scale Atomic/Molecular Massively Parallel Simulator) molecular dynamics simulation program. Reactive molecular dynamics (RMD) is a method for calculating the physical and chemical processes occurring in multibody systems at a micro scale using the ReaxFF reaction force field based on the MD simulation method. The combination of ReaxFF and MD is capable of simulating large systems without predefining the reaction path. The ReaxFF potential function field takes the bond order (BO) as the core to describe the bond making and bond breaking in the system. The bond order is a function of the distance among atoms, which is calculated at each cycle in molecular dynamics. By means of the Connect Table for the bond order obtained from the ReaxFF reaction force field calculation, the bond order cutoff radius can be used as a criterion for identifying and analyzing products.

To achieve the above purpose, the present invention adopts the following technical solution:

A multi-scale prediction method for an ablation behavior of a hypersonic aircraft heat resistant structure, comprising the steps of:

Step 1: without considering the shape deformation of an aircraft caused by an ablation retreating effect, according to a hypersonic incoming flow far-field boundary condition to be studied, performing a numerical simulation of a non-deformation hypersonic aircraft external flow field by using a macro computational fluid dynamics (CFD) solver;

Step 2: after the macro CFD calculation of the non-deformation aircraft converges, extracting the mass fraction and the temperature distribution of the wall surface components in the high-temperature area through the post-processing software Tecplot, averaging, and inputting the average wall surface component mass fraction and the average wall surface temperature into a micro RMD solver;

Step 3: performing micro modeling on a gas-solid interface of a target ablation heat resistant material according to the density and material elemental composition, thereby obtaining a micro model of the target ablation heat resistant material having a density consistent with the macro density; performing numerical simulation on the micro model through a micro RMD solver, wherein the heating temperature is consistent with the average temperature of the wall surface of the high-temperature area obtained by the CFD calculation; impacting the solid-phase atomic model in the micro model by taking the average mass fraction of the wall surface components obtained by the macro CFD calculation as the incidence ratio of molecules and atoms, thereby obtaining the msd.txt files for recording the mean square displacement data and the atomic path files;

Step 4: when the micro model becomes stable, calculating a system diffusion coefficient by means of a mean square displacement (MSD) method, and counting the densities of the original solid phase of the heat resistant material in different areas along the diffusion direction, thereby obtaining a slope factor of the density variation along the diffusion direction, and obtaining a mass loss rate by means of the Fick's law, wherein the ratio of the mass loss rate to the original density of the heat resistant material is the ablation retreating rate;

Step 5: inputting the ablation retreating rate obtained by the micro method into a macro CFD solver, and performing the grid reconstruction and transient calculation using the user-defined module UDF by taking the ablation retreating rate obtained by the micro calculation as the basis of the wall surface grid movement, thereby obtaining the transient variation of the external flow field of the hypersonic aircraft along the variation of the ablation retreating of the wall surface of the aircraft.

In another preferred embodiment of the present invention, specifically, step 1 comprising: inputting boundary conditions of far-field temperature, pressure intensity, velocity and far-field component mass fraction into a macro CFD solver; by solving a non-equilibrium N-S(Navier Stokes) equation, thereby obtaining result files including .cas files that record boundary conditions, turbulence models, component transport models, difference schemes and grids, as well as .dat files that record physical quantities such as temperature, pressure intensity, velocity and component mass fraction for each grid.

In another preferred embodiment of the present invention, specifically, step 2 comprising: inputting the .cas and .dat result files into the post-processing software Tecplot; subsequently, through the calculation, integrating and averaging the parameters stored on all grids on the wall surface of the high temperature area along the direction of the wall surface, and calculating to obtain the average wall temperature $T_w$, the average mass fraction of the wall surface N atoms $\omega_N$, the average mass fraction of the wall surface $N_2$ molecules $\omega_{N2}$, the average mass fraction of the wall surface NO molecules $\omega_{NO}$, the average mass fraction of the wall surface O atoms $\omega_O$, and the average mass fraction of the wall surface $O_2$ molecules $\omega_{O2}$.

In another preferred embodiment of the present invention, in step 3, performing micro modeling on a gas-solid interface of a target ablation heat resistant material according to the density and material elemental composition is to establish a single chain model of the target ablation heat resistant material through the Materials Studio and use Packmol to integrate the single chain model and randomly placing it into a simulation box, thereby obtaining a micro model and outputting the data files of the model.

In another preferred embodiment of the present invention, in step 3, the RMD solver adopts the LAMMPS.

Figure 5:
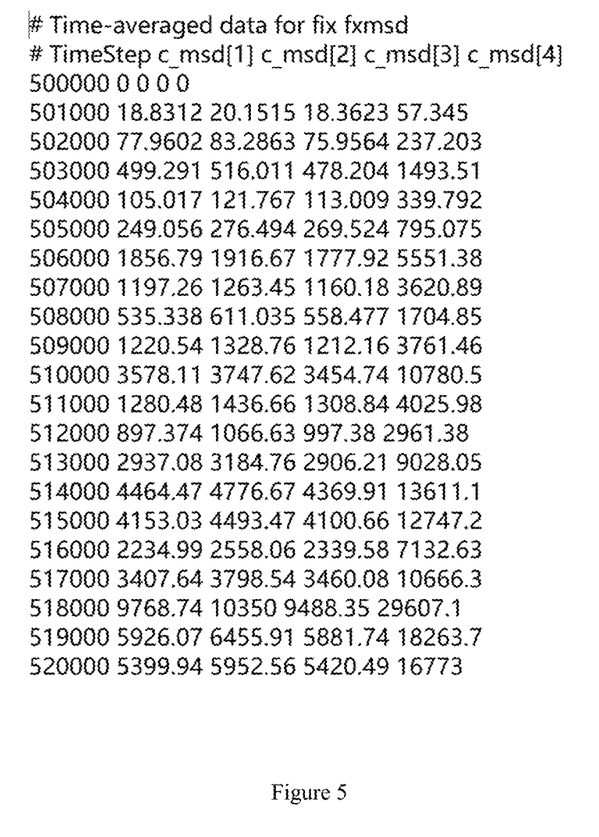
FIG. 5 is a schematic diagram illustrating the mean square displacement data file.

In another preferred embodiment of the present invention, specifically, step 4 comprising:

Step 41: reading the msd.txt file output by the LAMMPS molecular dynamics simulation, wherein as shown in FIG. 5, the first column in the file shows a time step, the second, third, and fourth columns respectively show the mean square displacements in x, y, and z directions, and the fifth column shows a total mean square displacement, namely:

$$MSD = \left\langle \frac{1}{N}\sum_{i=1}^{N}\left|\vec{r_i}(t) - \vec{r}(0)\right|^2 \right\rangle$$

obtaining a system diffusion coefficient D according to the slope factor of a curve of the linear fitting total mean square displacement varying along with the time variation:

$$D = \frac{1}{2Dim}\lim_{t\to\infty}\frac{d}{dt}MSD$$

wherein in the equation, MSD represents the total mean square displacement, $\overset{v}{r_i}(t)$ represents a t moment, which is a vector taking the origin as a starting point, and the $i^{th}$ atomic coordinate as an end point, $\overset{v}{r}(0)$ represents a position vector at an initial moment, and Dim represents a dimension;

Step 42: according to the exported atomic path files for all atoms, determining a curve of the original solid-phase atomic density varying in Z-direction along with the Z-axis at a stable moment; linearly fitting to obtain the slope factor of a curve of the relative atomic mass varying along with the z-axis, namely, the slope factor of the density varying with the distance in the diffusion direction;

Step 43: obtaining a mass loss rate J by Fick's law:

$$J = -D\left(\frac{d\varphi}{dx}\right)$$

wherein in the equation, $$\frac{d\varphi}{dx}$$

represents the slope factor of the density varying with the distance in the diffusion direction;

obtaining the ablation retreating rate by the following equation:

$$S^\& = \frac{dy_w}{dt} = \frac{j}{\rho_c}$$

wherein in the equation, $S^\&$ represents the ablation retreating rate, $y_w$ represents the wall surface normal vector coordinates, and $\rho_c$ represents the original density of the heat resistant material;

In another preferred embodiment of the present invention, specifically, step 5 comprising: setting the layering method as the grid reconstruction method; defining the boundary movement rate in the user-defined module UDF through the macro "DEFINE_CG_MOTION", wherein the boundary movement rate is the ablation retreating rate obtained in step 4, thereby performing the grid reconstruction; preserving the calculation settings in step 1, performing the macro CFD transient calculation, and enabling each time step to be accompanied by the movement and reconstruction of grids, thereby obtaining .cas files of each time step that record boundary conditions, turbulence models, component transport models, difference schemes and grids, as well as .dat files that record physical quantities such as temperature, pressure intensity, velocity and component mass fraction for each grid; inputting the obtained .cas file and .dat file for each time step into the post-processing software Tecplot, and using the cloud image tool to visualize the flow field cloud image; using a two-dimensional line image tool to call wall surface parameters, and dragging the time axis to observe the trend of target parameters along the time variation and ablation retreating variation.

Compared with the prior art, the present invention has the following advantages:

1. The present invention adopts a multi-scale prediction method with macro-micro coupling, which achieves higher accuracy compared to traditional single macro external flow field prediction methods and more precise representation of ablation retreating phenomena at the interface; compared to a single micro molecular dynamics simulation, the present invention solves the technical problem relating to the failure of being applied at a macro scale;
2. The traditional gas-solid heterogeneous reaction models between high enthalpy heat environments and heat resistant materials adopt excessively simplified empirical models, resulting in poor accuracy and reliability; moreover, the scale of the gas-solid interface of materials in actual flight service may lead to the failure of the continuity hypothesis, resulting in significant fluctuations in macro properties; therefore, a detailed study of heterogeneous reaction paths at the micro scale is capable of providing a more accurate velocity of the wall surface ablation retreating.

BRIEF DESCRIPTION OF THE DRAWINGS

FIG. 7 is a schematic diagram illustrating the atomic path data file;

DETAILED DESCRIPTION

Drawings and embodiments are combined hereinafter to further elaborate the technical solution of the present invention.

Figure 1:
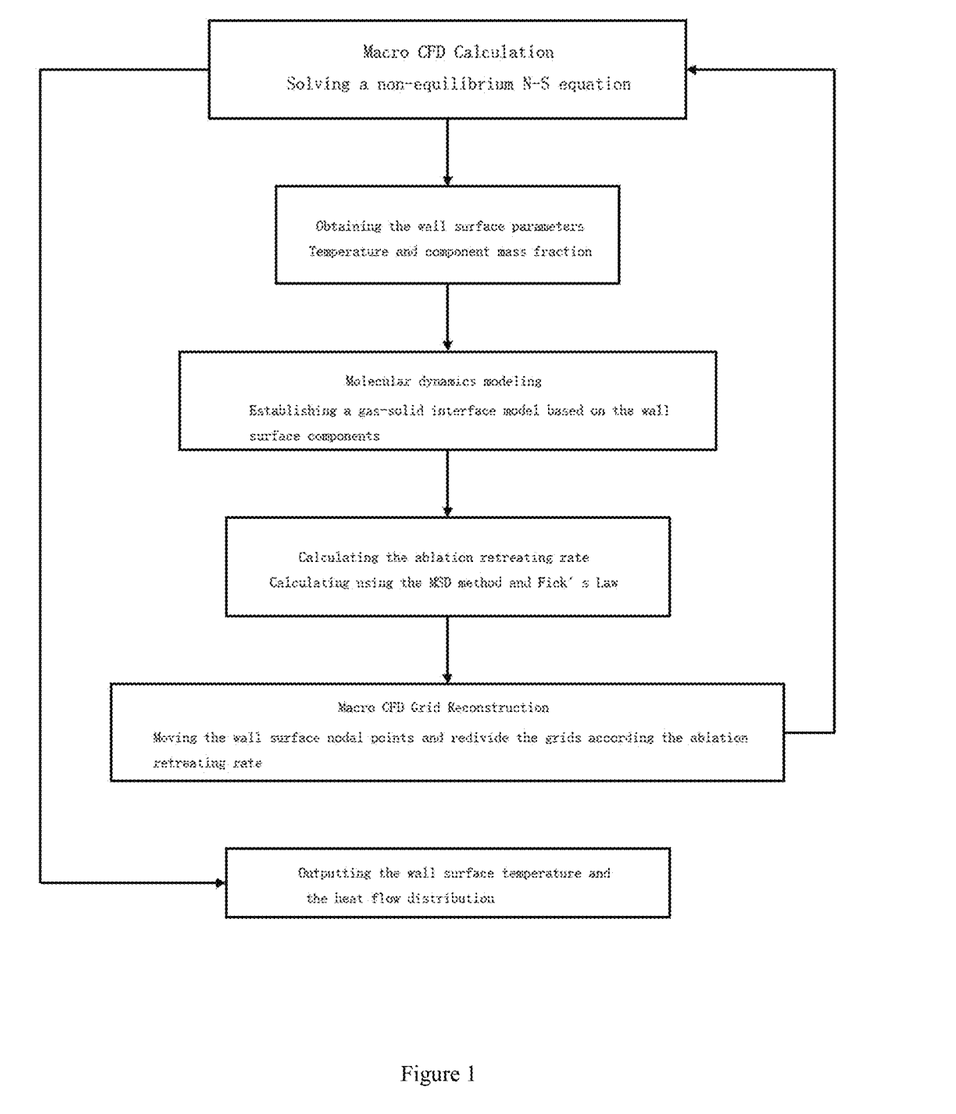
FIG. 1 is a flow chart illustrating the multi-scale prediction method for an ablation behavior of a hypersonic aircraft heat resistant structure of the present invention.
Figure 2:
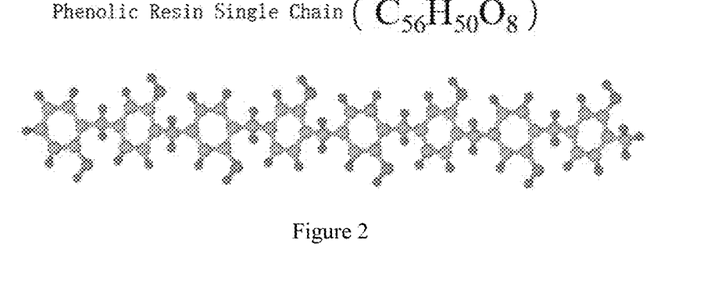
FIG. 2 is a schematic diagram illustrating a single chain model of the target material.
Figure 3:
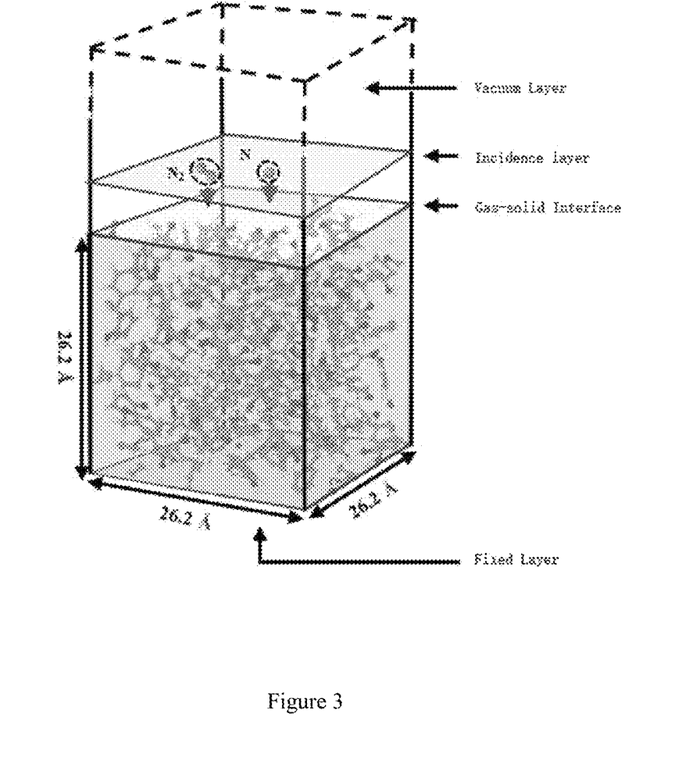
FIG. 3 is a schematic diagram illustrating the principle of atomic and molecular incidence at the gas-solid interface.
Figure 4:
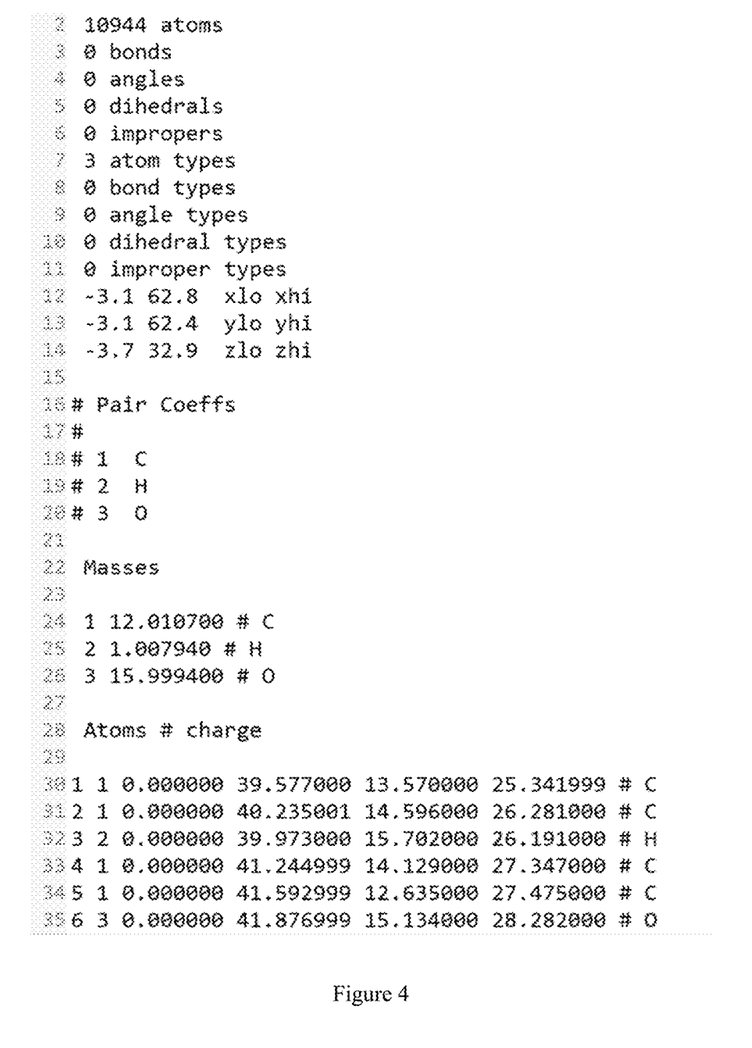
FIG. 4 is a schematic diagram illustrating the micro model data file of the target ablation material.
Figure 6:
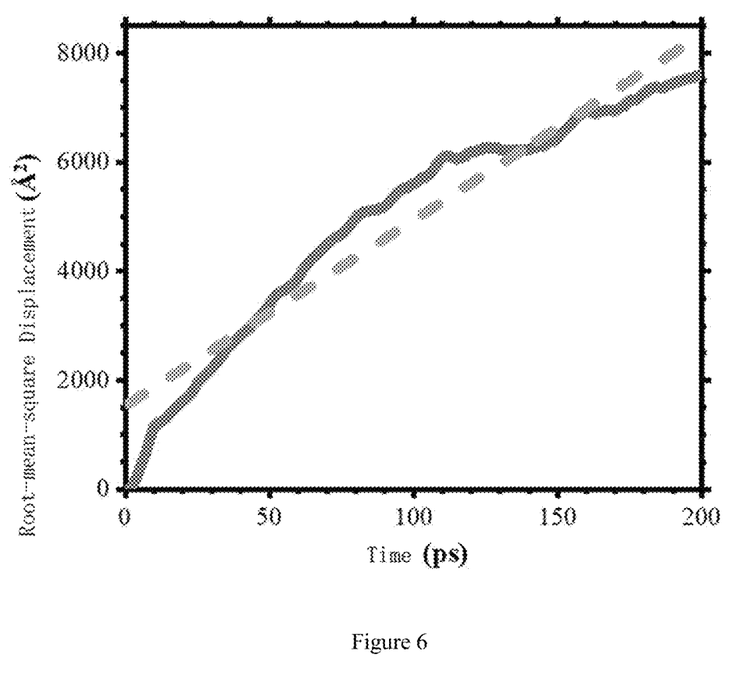
FIG. 6 is a schematic diagram illustrating the scatter and linear fitting of the mean square displacement along the variation of time.
Figure 8:
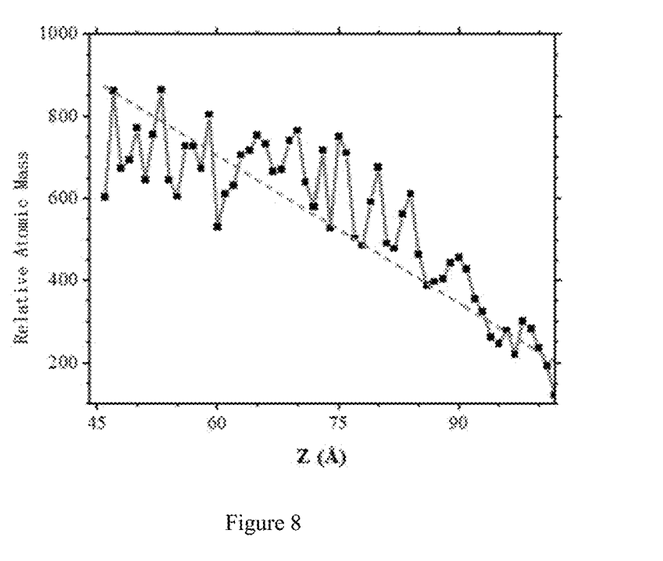
FIG. 8 is a schematic diagram illustrating the linear fitting of the relative atomic mass varying with the direction and position variation of the z-axis.
Figure 9:
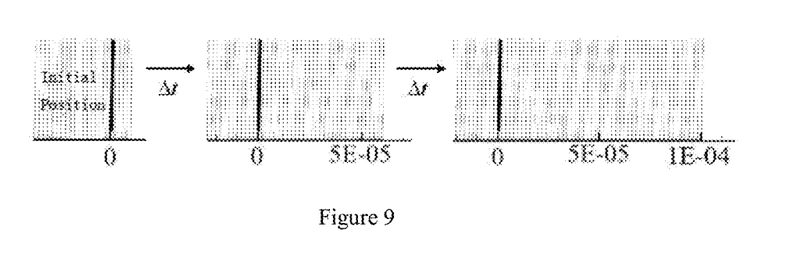
FIG. 9 is a schematic diagram illustrating the grids varying with the time variation using the layering method.
Figure 10A:
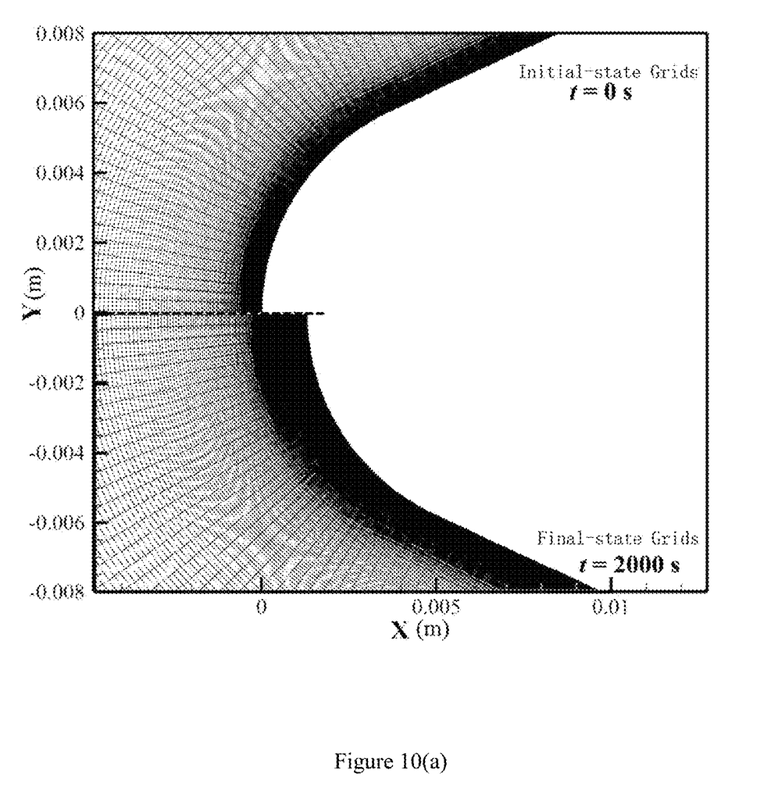
FIG. 10(a) is a schematic diagram illustrating the initial state and final state of grids.
Figure 10B:
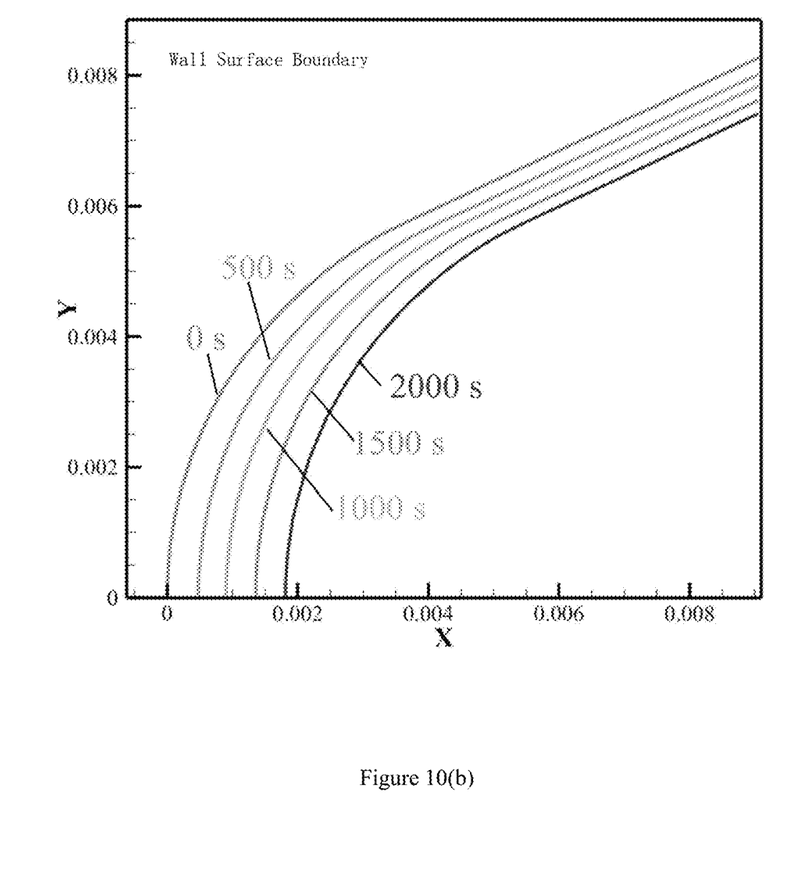
FIG. 10(b) is a schematic diagram illustrating the moving boundary at different moments.
Figure 11:
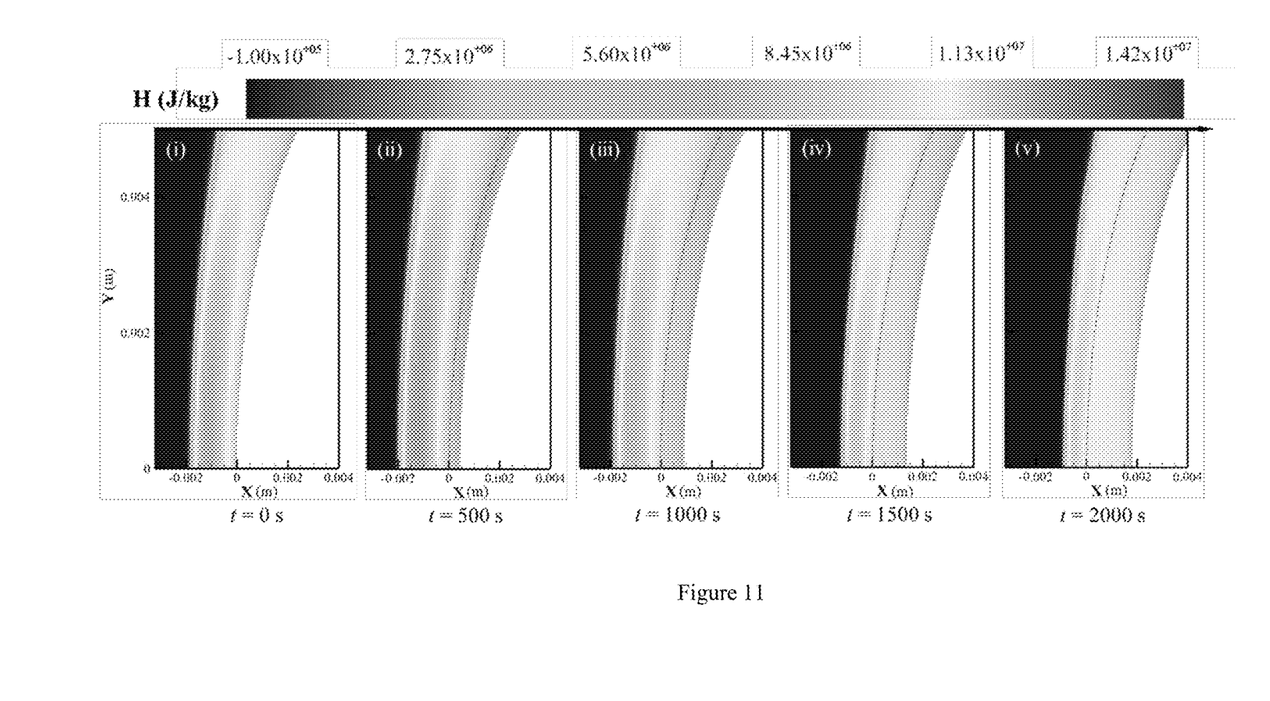
FIG. 11 is a schematic diagram illustrating an enthalpy cloud image varying with the time of ablation retreating.

As shown in FIG. 1, a multi-scale prediction method for an ablation behavior of a hypersonic aircraft heat resistant structure, comprising the steps of:

Step 1: without considering the shape deformation of an aircraft caused by an ablation retreating effect, according to a hypersonic incoming flow far-field boundary condition to be studied, performing a numerical simulation of a non-deformation hypersonic aircraft external flow field by using a macro computational fluid dynamics (CFD) solver;

Specifically, inputting boundary conditions of far-field temperature, pressure intensity, velocity and far-field component mass fraction into a macro CFD solver; by solving a non-equilibrium N-S(Navier Stokes) equation, thereby obtaining result files including cas files that record boundary conditions, turbulence models, component transport models, difference schemes and grids, as well as .dat files that record physical quantities such as temperature, pressure intensity, velocity and component mass fraction for each grid; wherein based on the conservation equation described by Lagrange Euler, the three-dimensional N-S equation to be solved in rectangular coordinates is as follows:

$$\frac{\partial \vec{W}}{\partial t} + \frac{\partial \vec{F}}{\partial x} + \frac{\partial \vec{G}}{\partial y} + \frac{\partial \vec{Q}}{\partial z} = \frac{\partial \vec{R}}{\partial x} + \frac{\partial \vec{S}}{\partial y} + \frac{\partial \vec{T}}{\partial z}$$

wherein in the equation, t represents time, x、y、and z respectively represent three directions of the rectangular coordinate system, $\vec{W}$ represents a matrix that is expressed as conserved variable vectors, and, and $\vec{F}$, $\vec{G}$ and $\vec{Q}$ are matrices that are expressed as convection flux vectors in the x、y、and z directions, which are respectively defined as:

$$\vec{W} = \begin{bmatrix} \rho_s \\ \rho_s u \\ \rho_s v \\ \rho_s w \\ \rho_s E \end{bmatrix}, \vec{F} = \begin{bmatrix} \rho_s u \\ \rho_s u^2 + p \\ \rho_s uv \\ \rho_s uw \\ \rho_s uE + up \end{bmatrix}, \vec{G} = \begin{bmatrix} \rho_s v \\ \rho_s vu \\ \rho_s v^2 + p \\ \rho_s vw \\ \rho_s vE + vp \end{bmatrix}, \vec{Q} = \begin{bmatrix} \rho_s w \\ \rho_s wu \\ \rho_s wv \\ \rho_s w^2 + p \\ \rho_s wE + wp \end{bmatrix}$$

wherein the subscript s represents the gas component, $\rho_s$ represents the density of the gas component s, p represents the gas pressure, u, v, and w respectively represent the velocity components in the x、y、and z directions, and E represents the total energy per unit mass of gas; wherein $\vec{R}$, $\vec{S}$ and $\vec{T}$ respectively represent the viscous flux terms in the x、y、and z directions, which are defined as:

$$\vec{R} = \begin{bmatrix} 0 \\ \tau_{xx} \\ \tau_{yx} \\ \tau_{zx} \\ \theta_x \end{bmatrix}, \vec{S} = \begin{bmatrix} 0 \\ \tau_{xy} \\ \tau_{yy} \\ \tau_{zy} \\ \theta_y \end{bmatrix}, \vec{T} = \begin{bmatrix} 0 \\ \tau_{xz} \\ \tau_{yz} \\ \tau_{zz} \\ \theta_z \end{bmatrix}$$

wherein $\theta_x$, $\theta_y$ and $\theta_z$ respectively represent the heat conduction terms in the x、y、and z directions, which are expressed as:

$$\theta_x = u\tau_{xx} + v\tau_{xy} + w\tau_{xz} + k\frac{\partial T}{\partial x}$$

$$\theta_y = u\tau_{yx} + v\tau_{yy} + w\tau_{yz} + k\frac{\partial T}{\partial y}$$

$$\theta_z = u\tau_{zx} + v\tau_{zy} + w\tau_{zz} + k\frac{\partial T}{\partial z}$$

wherein T represents the temperature; according to Stokes hypothesis, the components of the viscous stress tensor of Newtonian fluid are defined as:

$$\tau_{xx} = 2\mu\frac{\partial u}{\partial x} - \frac{2}{3}\mu\left(\frac{\partial u}{\partial x} + \frac{\partial v}{\partial y} + \frac{\partial w}{\partial z}\right), \tau_{xy} = \tau_{yx} = \mu\left(\frac{\partial u}{\partial y} + \frac{\partial v}{\partial x}\right)$$

$$\tau_{yy} = 2\mu\frac{\partial v}{\partial y} - \frac{2}{3}\mu\left(\frac{\partial u}{\partial x} + \frac{\partial v}{\partial y} + \frac{\partial w}{\partial z}\right), \tau_{xz} = \tau_{zx} = \mu\left(\frac{\partial u}{\partial z} + \frac{\partial w}{\partial x}\right)$$

$$\tau_{zz} = 2\mu\frac{\partial w}{\partial z} - \frac{2}{3}\mu\left(\frac{\partial u}{\partial x} + \frac{\partial v}{\partial y} + \frac{\partial w}{\partial z}\right), \tau_{yz} = \tau_{zy} = \mu\left(\frac{\partial v}{\partial z} + \frac{\partial w}{\partial y}\right)$$

wherein µ represents the viscosity coefficient, which is obtained by Sutherland's equation:

$$\frac{\mu}{\mu_0} = \frac{T_0 + C}{T + C}\left(\frac{T}{T_0}\right)^{1.5}$$

wherein $T_0$ represents the sea level temperature, normally taken as $T_0$=288.15 K, $\mu_0$ represents the sea level viscosity coefficient, and C is a constant, normally taken as C=110.4 K; wherein K represents the thermal conductivity of a perfect gas, which is defined as:

$$k = c_p \frac{\mu}{P_r}$$

wherein Pr represents the Prandtl number, the laminar boundary layer and turbulent boundary layer are respectively taken as 0.72 and 0.9, and $c_p$ represents the constant pressure specific heat capacity;

Step 2: after the macro CFD calculation of the non-deformation aircraft converges, extracting the mass fraction and the temperature distribution of the wall surface components in the high-temperature area through the post-processing software Tecplot, averaging, and inputting the average wall surface component mass fraction and the average wall surface temperature into a micro RMD solver;

Specifically, inputting the cas and .dat result files into the post-processing software Tecplot; subsequently, through the calculation, integrating and averaging the parameters stored on all grids on the wall surface of the high temperature area along the direction of the wall surface, and calculating to obtain the average wall temperature $T_w$, the average mass fraction of the wall surface N atoms $\omega_N$, the average mass fraction of the wall surface $N_2$ molecules $\omega_{N2}$, the average mass fraction of the wall surface NO molecules $\omega_{NO}$, the average mass fraction of the wall surface O atoms $\omega_O$, and the average mass fraction of the wall surface $O_2$ molecules $\omega_{O2}$;

Step 3: performing micro modeling on a gas-solid interface of a target ablation heat resistant material according to the density and material elemental composition, thereby obtaining a micro model of the target ablation heat resistant material having a density consistent with the macro density; performing numerical simulation on the micro model through a micro RMD solver, wherein the heating temperature is consistent with the average temperature of the wall surface of the high-temperature area obtained by the CFD calculation; impacting the solid-phase atomic model in the micro model by taking the average mass fraction of the wall surface components obtained by the macro CFD calculation as the incidence ratio of molecules and atoms, thereby obtaining the msd.txt files for recording the mean square displacement data and the atomic path files;

Specifically, as shown in FIG. 2, establishing a single chain model of the target ablation heat resistant material through the Materials Studio; as shown in FIG. 3, using Packmol to integrate the single chain model and randomly placing it into a simulation box to obtain a micro model of the target ablation material, wherein as shown in FIG. 4, the fixed layer is a solid-phase atomic model of phenolic resin composed of C, H, and O atoms, wherein the model contains the number of atoms, as well as information such as atomic type and atomic coordinates; after obtaining the micro model of the target ablation material, performing the numerical simulation of the established micro model of the material using LAMMPS, taking the average wall temperature obtained in step 2 as the heating temperature, and impacting the solid-phase atomic model in the micro model by taking the average mass fraction of the wall surface components obtained in step 2 as the incidence ratio of molecules and atoms, thereby obtaining the msd.txt files for recording the mean square displacement data and the atomic path files;

Step 4: when the micro model becomes stable, calculating a system diffusion coefficient by means of a mean square displacement (MSD) method, and counting the densities of the original solid phase of the heat resistant material in different areas along the diffusion direction, thereby obtaining a slope factor of the density variation along the diffusion direction, and obtaining a mass loss rate by means of the Fick's law, wherein the ratio of the mass loss rate to the original density of the heat resistant material is the ablation retreating rate;

Specifically, step 4 comprising:

Step 41: reading the msd.txt file output by the LAMMPS molecular dynamics simulation, wherein as shown in FIG. 5, the first column in the file shows a time step, the second, third, and fourth columns respectively show the mean square displacements in X, Y, and Z directions, and the fifth column shows a total mean square displacement, namely:

$$MSD = \left\langle \frac{1}{N}\sum_{i=1}^{N}\left|\vec{r}_i(t) - \vec{r}(0)\right|^2 \right\rangle$$

as shown in FIG. 6, obtaining a system diffusion coefficient D according to the slope factor of a curve of the linear fitting total mean square displacement varying along with the time variation:

$$D = \frac{1}{2Dim}\lim_{t\to\infty}\frac{d}{dt}MSD$$

wherein in the equation, MSD represents the total mean square displacement, $\vec{r}_i(t)$ represents a t moment, which is a vector taking the origin as a starting point, and the $i^{th}$ atomic coordinate as an end point, $\vec{r}(0)$ represents a position vector at an initial moment, N represents a total number of atoms, and Dim represents a dimension;

Step 42: according to the exported atomic path files "all. Lammpstrj" for all atoms, as shown in FIG. 7, determining a curve of the original solid-phase atomic density varying in Z-direction along with the Z-axis at a stable moment; more specifically, in this step, extracting the coordinate information of all atoms at a moment to be processed from the exported atomic path files of all atoms, inputting the extracted coordinate information of all atoms at the generation moment of the to-be-tracked molecule into MATLAB in the form of a character string, and forming a two-dimensional array A of the character string by taking "space" and "tab" as space characters, wherein the two-dimensional array A includes nine columns of data: the first column shows an atomic number, the second column shows an atomic category number, and the third, fourth and fifth columns respectively show atomic coordinate information, namely, the third column showing the x-coordinate, the fourth column showing the y-coordinate, the fifth column showing the z-coordinate, the sixth column showing the x-direction speed component, the seventh column showing the y-direction speed component, the eighth column showing the z-direction speed component, and the ninth column showing the atomic electric charge amount, wherein the solid-phase height at the initial moment is 100 Å, which is divided into 100 parts such that the height of each part is 1 Å; going through all of the atoms at the moment, counting the number of atoms using the atomic category number shown in the second column, and multiplying the number of atoms by the relative atomic mass of each atom, thereby obtaining the relative atomic mass of the solid phase in a thickness of 1 Å; as shown in FIG. 8, linearly fitting the slope factor of a curve of the relative atomic mass varying along with the z-axis;

Step 43: obtaining a mass loss rate J by Fick's law:

$$J = -D\left(\frac{d\varphi}{dx}\right)$$

wherein in the equation, $$\frac{d\varphi}{dx}$$

represents the slope factor of the density varying with the distance in the diffusion direction;

obtaining the ablation retreating rate by the following equation:

$$S^{\&} = \frac{dy_w}{dt} = \frac{J}{\rho_c}$$

wherein in the equation, $S^{\&}$ represents the ablation retreating rate, $y_w$ represents the wall surface normal vector coordinates, and $\rho_c$ represents the original density of the heat resistant material;

Step 5: inputting the ablation retreating rate obtained by the micro method into a macro CFD solver, and performing the grid reconstruction and transient calculation using the user-defined module UDF by taking the ablation retreating rate obtained by the micro calculation as the basis of the wall surface grid movement, thereby obtaining the transient variation of the external flow field of the hypersonic aircraft along the variation of the ablation retreating of the wall surface of the aircraft;

As shown in FIG. 9, setting the layering method as the grid reconstruction method, wherein the boundary grids are continuously layered and retreat, and the type of the moving boundary is a rigid body; defining the boundary movement rate in the user-defined module UDF through the macro "DEFINE_CG_MOTION", wherein the boundary movement rate is the ablation retreating rate obtained in step 4, thereby performing the grid reconstruction; FIG. 10(a) and FIG. 10(b) are schematic diagrams respectively illustrating the initial state and final state of grids, as well as the boundary positions at different moments; preserving the calculation settings in step 1, performing the macro CFD transient calculation, and enabling each time step to be accompanied by the movement and reconstruction of grids, thereby obtaining .cas files of each time step that record boundary conditions, turbulence models, component transport models, difference schemes and grids, as well as .dat files that record physical quantities such as temperature, pressure intensity, velocity and component mass fraction for each grid; inputting the obtained .cas file and .dat file for each time step into the post-processing software Tecplot, and using the cloud image tool to visualize the flow field cloud image; using a two-dimensional line image tool to call wall surface parameters, and dragging the time axis to observe the trend of target parameters along the time variation and ablation retreating variation; as shown in FIG. 11, the dotted line in the cloud image shows the initial wall position of the hypersonic aircraft.

The above are merely the preferred embodiments of the present invention and are not used to limit the present invention. For those skilled in the art, various modifications and alterations may be made to the present invention. Therefore, any modifications, equivalent replacements and improvements made within the spirit and principles of the present invention shall fall into the scope defined by the claims of the present invention.

The invention claimed is:

1. A multi-scale prediction method for an ablation behavior of a hypersonic aircraft heat resistant structure, comprising the steps of:
step 1: without considering a shape deformation of an aircraft caused by an ablation retreating effect, according to a hypersonic incoming flow far-field boundary condition to be studied, performing a numerical simulation of a non-deformation hypersonic aircraft external flow field by using a macro Computational Fluid Dynamics (CFD) solver;
step 2: after a macro CFD calculation of a non-deformation hypersonic aircraft converges, extracting mass fractions and temperatures of wall surface components in a high-temperature area through a post-processing software Tecplot, averaging the mass fractions of the wall surface components to obtain an average wall surface component mass fraction, averaging the temperatures of the wall surface components to obtain an average wall surface temperature, and inputting the average wall surface component mass fraction and the average wall surface temperature into a micro Reactive Molecular Dynamics (RMD) solver;
step 3: performing micro modeling on a gas-solid interface of a target ablation heat resistant material according to a density and a material elemental composition, thereby obtaining a micro model of the target ablation heat resistant material; performing numerical simulation on the micro model through a micro RMD solver, wherein a heating temperature is consistent with the average wall surface temperature of the high-temperature area obtained by the macro CFD calculation; impacting a solid-phase atomic model in the micro model by taking the average wall surface component mass fraction obtained by the macro CFD calculation as an incidence ratio of molecules and atoms, thereby obtaining a msd.txt file for recording mean square displacement data and an atomic path files;
step 4: when the micro model becomes stable, calculating a system diffusion coefficient by means of a Mean Square Displacement (MSD) method, and counting densities of an original solid phase of the target ablation heat resistant material in different areas along a diffusion direction, thereby obtaining a slope factor of a density variation with a distance along the diffusion direction, and obtaining a mass loss rate by means of a Fick's law, wherein a ratio of the mass loss rate to an original density of the target ablation heat resistant material is an ablation retreating rate;
step 5: inputting the ablation retreating rate obtained by the micro method into the macro CFD solver, and performing a grid reconstruction and a transient calculation using an user-defined module (UDF) by taking the ablation retreating rate obtained by the micro calculation as a basis of a wall surface grid movement, thereby obtaining a transient variation of a hypersonic aircraft external flow field along a variation of an ablation retreating of a wall surface of the aircraft.

2. The multi-scale prediction method for an ablation behavior of a hypersonic aircraft heat resistant structure of claim 1, wherein step 1 further comprising: inputting boundary conditions of a far-field temperature, a pressure intensity, a velocity and far-field component mass fraction into the macro CFD solver; by solving a non-equilibrium N-S equation, thereby obtaining result files including .cas files that record the boundary conditions, turbulence models, component transport models, difference schemes and grids, as well as .dat files that record physical quantities such as temperature, pressure intensity, velocity and component mass fraction for each grid.

3. The multi-scale prediction method for an ablation behavior of a hypersonic aircraft heat resistant structure of claim 2, wherein step 2 further comprising:
inputting the .cas files and the .dat files into the post-processing software Tecplot;
subsequently, through a calculation of the post-processing software Tecplot, integrating and averaging parameters stored on all grids on a wall surface of the high temperature area along a direction of the wall surface, and calculating to obtain the average wall surface temperature $T_w$, an average mass fraction of wall surface N atoms $\omega_N$, an average mass fraction of wall surface $N_2$ molecules $\omega_{N2}$, an average mass fraction of wall surface NO molecules $\omega_{NO}$, an average mass fraction of wall surface O atoms $\omega_O$, and an average mass fraction of wall surface $O_2$ molecules $\bullet_{O2}$.

4. The multi-scale prediction method for an ablation behavior of a hypersonic aircraft heat resistant structure of claim 3, wherein in step 3, performing micro modeling on the gas-solid interface of the target ablation heat resistant material according to the density and material elemental composition is to establish a single chain model of the target ablation heat resistant material through a Materials Studio and use Packmol to integrate the single chain model and randomly placing it into a simulation box, thereby obtaining the micro model and outputting data files of the micro model.

5. The multi-scale prediction method for an ablation behavior of a hypersonic aircraft heat resistant structure of claim 4, wherein in step 3, the micro RMD solver adopts a Large Scale Atomic/Molecular Massively Parallel Simulator (LAMMPS).

6. The multi-scale prediction method for an ablation behavior of a hypersonic aircraft heat resistant structure of claim 5, wherein step 4 specifically comprising:

step 41: reading the msd.txt file output by a LAMMPS molecular dynamics simulation, a first column in the msd.txt file shows a time step, second, third, and fourth columns respectively show mean square displacements in X, Y, and Z directions, and a fifth column shows a total mean square displacement, namely:

$$MSD = \left\langle \frac{1}{N}\sum_{i=1}^{N}\left|\vec{r}_i(t) - \vec{r}(0)\right|^2 \right\rangle$$

obtaining the system diffusion coefficient (D) according to a slope factor of a linear fitting curve of the total mean square displacement varying along with a time variation:

$$D = \frac{1}{2Dim}\lim_{t\to\infty}\frac{d}{dt}MSD$$

wherein in the equation, MSD represents the total mean square displacement, $\vec{r}_i(t)$ represents a vector at a t moment, wherein the vector takes an origin as a starting point and an $i^{th}$ atomic coordinate as an end point, $\vec{r}(0)$ represents a position vector at an initial moment, and Dim represents a dimension;

step 42: according to the atomic path files for all atoms, determining a curve of an original solid-phase atomic density varying in Z-direction along with a Z-axis at a stable moment; linearly fitting to obtain a slope factor of a curve of a relative atomic mass varying along with the z-axis, namely, the slope factor of the density variation with the distance along the diffusion direction;

step 43: obtaining the mass loss rate (J) by the Fick's law:

$$J = -D\left(\frac{d\varphi}{dx}\right)$$

wherein in the equation, $$\frac{d\varphi}{dx}$$

represents the slope factor of the density variation with the distance along the diffusion direction;
obtaining the ablation retreating rate by the following equation:

$$\dot{S} = \frac{dy_w}{dt} = \frac{J}{\rho_c}$$

wherein in the equation, $\dot{S}$ represents the ablation retreating rate, $y_w$ represents wall surface normal vector coordinates, and $\rho_c$ represents the original density of the target ablation heat resistant material.

7. The multi-scale prediction method for an ablation behavior of a hypersonic aircraft heat resistant structure of claim 6, wherein step 5 further comprising:
setting a layering method as a method of the grid reconstruction; defining a boundary movement rate in the user-defined module (UDF) through a macro "DEFINE_CG_MOTION", wherein the boundary movement rate is the ablation retreating rate obtained in step 4, thereby performing the grid reconstruction; preserving calculation settings in step 1, performing a macro CFD transient calculation, and enabling each time step to be accompanied by a grid movement and the grid reconstruction, thereby obtaining .cas files of each time step that record boundary conditions, turbulence models, component transport models, differences schemes and grids, as well as .dat files that record physical quantities such as temperature, pressure intensity, velocity and component mass fraction for each grid; inputting the .cas files and .dat files of each time step into the post-processing software Tecplot, and using a cloud image tool to visualize a flow field cloud image; using a two-dimensional line image tool to call wall surface parameters, and dragging time axis to observe a trend of target parameters along the time variation and the variation of the ablation retreating.

* * * * *